Feb. 14, 1961 W. A. SCHAICH 2,971,239
METHOD OF MAKING CAST SHAPES
Filed Dec. 16, 1957 3 Sheets-Sheet 1
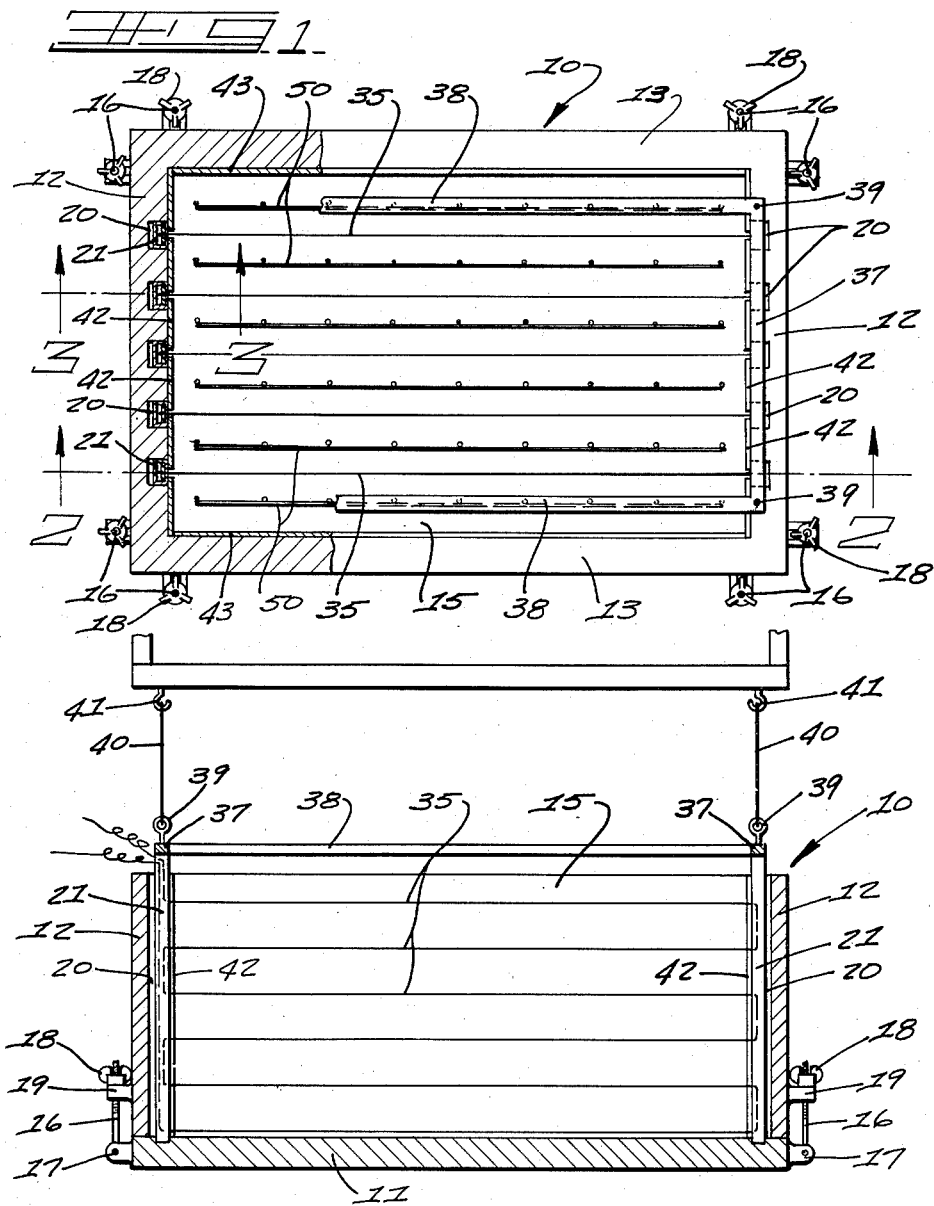
INVENTOR
W. A. SCHAICH
BY
Rule & Hoge
ATTORNEYS

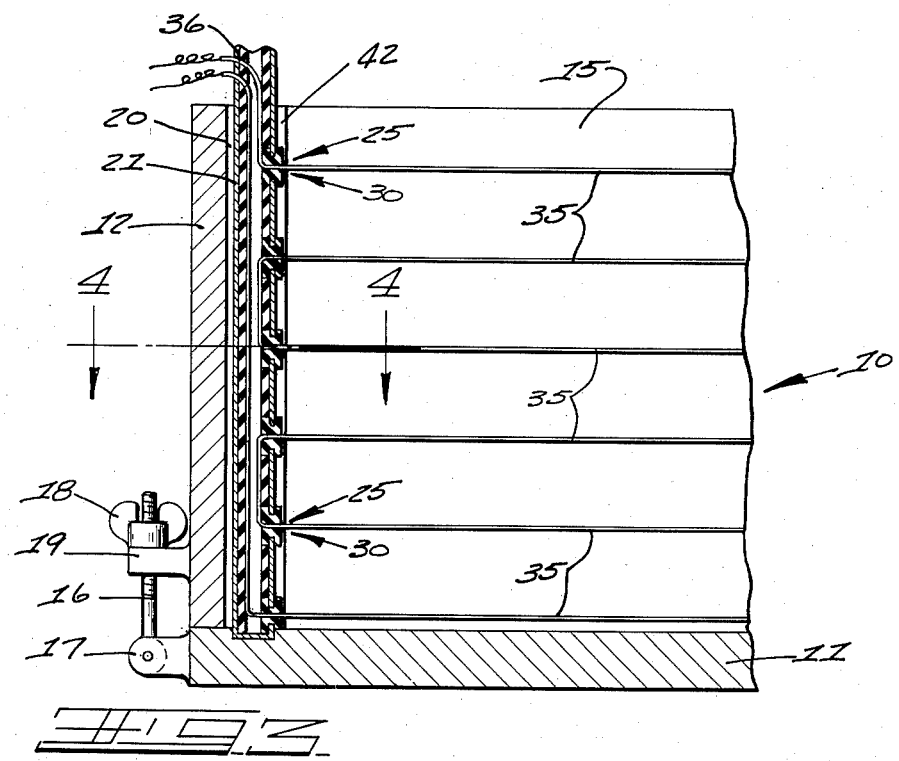
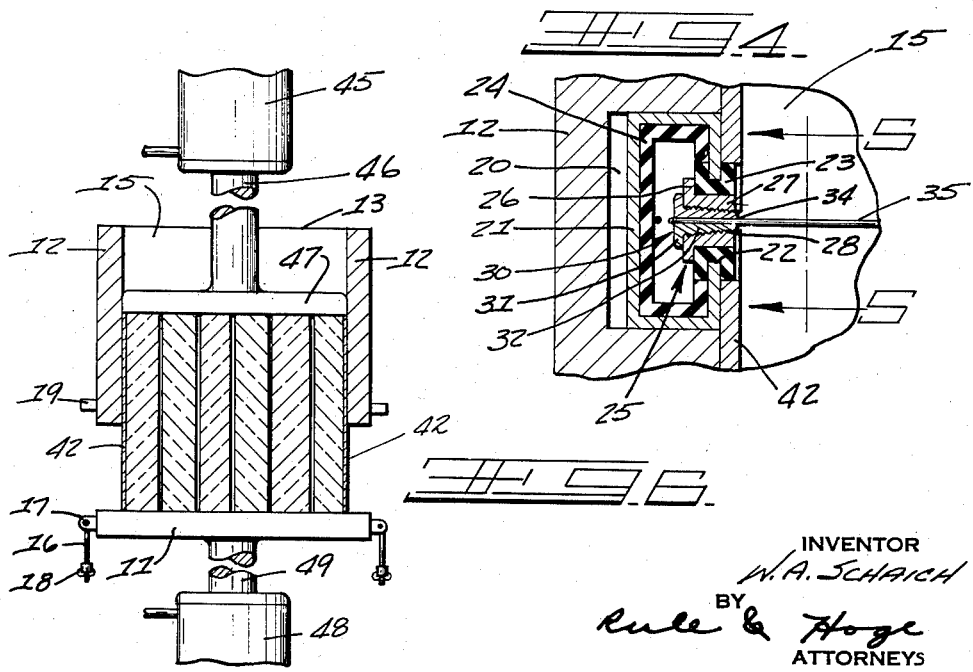

Feb. 14, 1961 W. A. SCHAICH 2,971,239
METHOD OF MAKING CAST SHAPES
Filed Dec. 16, 1957 3 Sheets-Sheet 3

INVENTOR
W. A. SCHAICH
BY
Rule & Hoge
ATTORNEYS

United States Patent Office 2,971,239
Patented Feb. 14, 1961

2,971,239
METHOD OF MAKING CAST SHAPES

Wilbur A. Schaich, Maumee, Ohio, assignor to Owens-Illinois Glass Company, a corporation of Ohio Filed Dec. 16, 1957, Ser. No. 702,955

6 Claims. (Cl. 25—155)

The present invention relates to a method of and apparatus for making calcium silicate shapes. More particularly, this invention proposes certain method and apparatus improvements in the manufacture of cast foamed calcium silicate (commonly known as "cellular concrete") slabs.

In the manufacture of light weight calcium silicate bodies, a typical commercial process involves the preparation of a slurry of cement, lime, and silica to which a pre-formed foam is added to form a casting mix. The casting mix is poured into a mold having spaced steel reinforcing grids for precuring at atmospheric pressure and temperature for a period of about 8 hours, following which the pre-cured cast block is severed intermediate the reinforcing grids into slabs and autoclaved for a period of about 10 hours at a steam pressure of about 150 lbs. per square inch to form a finished product having a density of about 30 to 40 lbs. per cubic feet.

The pre-curing of the slurry mix under atmospheric conditions is necessary to pre-set the cast block substantially throughout the block to an extent sufficient to give the block sufficient strength to survive the subsequent mold removal and slab-severing operations and to make the severed slabs self-supporting. Further, the necessity of internally curing the block components prohibits effective speeding-up of the pre-curing by merely enclosing the slab in a heated chamber or pre-curing furnace.

It has now been found that the time required for the pre-curing of the cast block may be materially reduced by internally heating the block by means of electrical resistance heating wires disposed internally of the slab. Further, these heating wires may be utilized to sever the block into slabs of the desired dimensions.

Thus, the present invention proposes the casting of an aqueous calcium-silicate slurry in a mold of unit slab length and breadth dimensions and of multiple slab thickness dimensions, disposing electrically resistant cutting wires in the cast block at locations corresponding to unit slab thickness, utilizing the wires to electrically heat the interior of the cast slurry block, thereby hastening the pre-curing of the slurry, and finally effecting relative movement of the wires and the cast block to sever the block into a plurality of slabs of unit slab length, breadth, and thickness.

It is, therefore, an important object of the present invention to provide a method of forming cast calcium-silicate slabs by the pre-curing of the slab by means of electrical resistance wires embedded therein and subsequently utilizing the wires to sever the block into unit slabs.

Another important object of this invention is the provision of an apparatus for forming calcium-silicate slabs and including a mold of multiple slab dimensions, and a plurality of resistance heating and block-severing wires disposed in the mold.

It is a further object to provide a method for making calcium-silicate shapes by casting a slurry of calcium-silicate in a mold of multiple shape dimensions, the mold being subdivided into shape dimensions by grids of electrical resistance wires cast in situ in the slurry, passing electric current through the molds to pre-cure the slurry to an extent at least sufficient to enable the cast body to retain its shape, and effecting relative movement between the cast body and the wire grid to sever the body into slab units.

Yet another object is the provision of an apparatus for the manufacture of cast calcium-silicate shapes including a mold of multiple shape dimensions, a grid of electrical resistance wire subdividing the mold into shape unit dimensions, means for passing an electric current through the grid, and means for effecting relative movement between the cast body and the grid to sever the body into unit shapes.

An additional important object is the provision of a method of forming cast calcium-silicate slabs wherein an initial cast body is formed with in situ wire grids subdividing the body into slab units, the body is pre-cured by passing an electric current through the grids, and the body is severed into unit slabs by effecting relative movement between the cast body and the grids.

Other and further objects and advantages of the invention will appear from the following detailed description taken in conjunction with the annexed drawing, in which:

On the drawings:

Fig. 1 is a plan view, with parts broken away and in section, illustrating the apparatus of the present invention;

Fig. 2 is a sectional view taken along the plane 2—2 of Fig. 1;

Fig. 3 is an enlarged fragmentary sectional view similar to Fig. 2;

Fig. 4 is an enlarged fragmentary view taken along the plane 4—4 of Fig. 3;

Fig. 5 is an enlarged sectional view taken along the plane 5—5 of Fig. 4;

As shown on the drawings:

Figure 6:
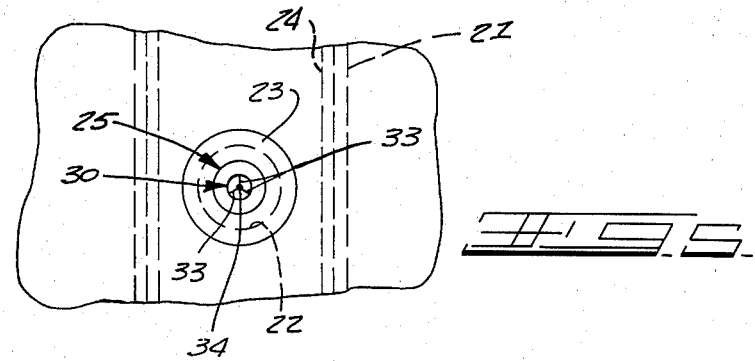
Fig. 6 is a view illustrating a mold-stripping apparatus suitable for use in the present invention.

In Fig. 1, reference numeral 10 refers generally to a mold which may advantageously be utilized in connection with the method of the present invention and which constitutes the improved apparatus of the present invention.

More particularly, the mold 10 comprises a bottom wall 11 having superimposed thereon upstanding end walls 12 and side walls 13. The side and end walls may be integrally formed or joined to one another to peripherally enclose an interior mold space 15 which is rectangular when viewed in plan (Fig. 1). The interior mold space 15 is closed at the bottom by the bottom wall 11.

Preferably, bottom wall 11 is removably secured to the end walls 12 and the side walls 13 by suitable means, as by swing bolts 16 pivotally carried by the bottom wall 11, as at 17, and carrying wing nuts or the like 18 engaging projections 19 formed on the side and end walls 13 and 12.

The end walls 12 of the mold 10 are preferably provided with a plurality of transversely spaced, vertically extending recesses 20 which are rectangular in cross-section (Figs. 1 and 3). As best seen in Fig. 4, these recesses 20 open throughout their entire transverse extent onto the mold space 15 and run vertically throughout the entire extent of the end walls 12. Slidably disposed within each of the recesses 20 to extend vertically therein are support elements 21. These support elements 21 are of rectangular cross-section and have a plurality of vertically aligned apertures 22 communicating through the upper mouth of the recess with the interior mold space 15.

Each of the apertures 22 receives a resilient adapter grommet 23 formed of an elastomeric insulating material, such as rubber. Similar insulating material 24 covers the interior surfaces of the support elements 21. Disposed interiorly of each channel and projecting through each of the apertures 22 thereof is a chuck sleeve 25 having a radially enlarged seating collar 26 overlying the corresponding grommet 23 and those portions of the element 21 and the element insulation 24 adjacent the corresponding aperture 22. Each such sleeve 25 has an elongated tubular portion 27 projecting through the grommet and having an interiorly threaded and tapered aperture 28. Threaded into the aperture 28 of each of the chuck sleeves 25 is a tapered and slit chuck insert 30 having a radially enlarged head 31 and an elongated tapered shank 32 threadedly engaged with the tapered aperture of the sleeve 25. The shank of the insert is slit radially at a plurality of locations, as at 33 (Fig. 5), so that axial threaded movement of the insert into the sleeve forces the tapered shank radially inwardly to peripherally grip a wire 35 extending axially through the bore 34 of the insert.

As best seen in Figs. 2 and 3, each of the elements 21 is provided wtih a plurality of vertically aligned apertures 22, and each aperture carries the chuck assembly illustrated in detail in Fig. 4 of the drawings. Each of the end walls 12 carries a group of transversely spaced elements 21, and the elements of opposed end walls 12 are aligned longitudinally of the mold space 15 as best illustrated in Fig. 1. Each pair of longitudinally spaced and aligned channels supports a grid of wires 35, consisting of a single wire strand entering one element 21, as at 36 (Fig. 3) in one end wall 12, projecting through one chuck assembly 25, 30 carired by the one channel and extending longitudinally across the mold space 15 for reception by a horizontally and longitudinally aligned chuck assembly 30, 35 carried by an element 21 in the opposing end wall 12. This same wire then extends vertically to the next lower chuck assembly carried by the particular element 21 and then longitudinally and horizontally of the mold chamber for reception by the next lower chuck assembly retained by the element 21 through which the wire enters. It will thus be seen that a plurality of strands of wire forming a single grid are retained by the opposing and aligned channels 42. Each pair of opposing and aligned channels carries its own grid, the grids subdividing the interior mold space 15 in a manner to be hereinafter more fully described. Obviously, the grid may be defined by a plurality of different single wire strands retained by chuck assemblies at either end thereof.

The elements 21 are retained in alignment, both longitudinally and transversely of the mold space 15, by means of an upper rectangular frame comprising end elements and longitudinal elements 37 and 38, respectively, joined to one another. Secured at the corners of the frame defined by the elements 37 and 38 are upwardly projecting eye bolts or the like 39 adapted to receive a cable sling or the like 40 secured to a grappling hook 41 of an overhead crane or similar material-handling apparatus. Elevation of the grappling hook 41 will elevate the frames 37, 38 and all of the channels 22 and the wire grids carried thereby relative to the mold 10.

To aid in removing the channels 22 from the mold space 15 and to aid in stripping a cast body from the mold side and end walls, the side walls are provided with longitudinally extending, vertically projecting slip plates 41 and the end walls 12 are provided with transversely aligned, vertically extending individual slip plates 42. The transversely spaced slip plates 42 are utilized in order to provide clearance therebetween for the wire grids.

The utility of the slip plates is well illustrated in Fig. 6 of the drawings, wherein it will be seen that the following vertical removal of the grid assemblies by means of the sling 40 and hook 41, the cut slabs within the mold space 15 are removed by operation of an overhead actuating apparatus, such as a fluid pressure cylinder 45 and piston 46, the piston 46 carrying a pressure plate 47. Pressure plate 47 fits snugly within the mold space 15 and is operative to depress the cut slabs vertically from the side and end walls 12, 13 after the mold bottom 11 has been unlatched from the side and end plates. A lower return fluid pressure cylinder 48 and piston 49 are utilized to return the bottom plate 11 to its position underlying the end and sides 12 and 13 following ejection of the cut slabs.

Figure 7:
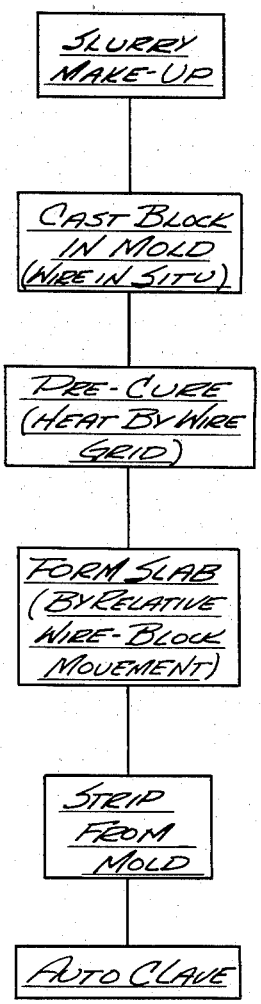
Fig. 7 is a flow diagram illustrating the method of the present invention.

The method of the present invention preferably utilizes apparatus such as that illustrated in Figs. 1–6 of the drawings, the various steps of the method being illustrated in the flow diagram of Fig. 7.

The method and apparatus of the present invention are particularly adapted for the formation of cellular hydrosilicate slurries, particularly such slurries as are utilizable for the formation of cellular concrete. Cellular concrete usually contains cementitious ingredients, pozzolanas, accelerators, and foam or foam-forming ingredients. The cementitious ingredients are preferably cement of the Portland type, either normal or of the high early strength type, and lime, preferably quicklime, although a high calcium hydrate of lime may be utilized. Any desired pozzolanic material may be utilized, a pozzolana being defined as a finely divided material rich in silica or alumina which, while not necessarily cementitious in itself, will react at ordinary temperatures with hydrated lime in the presence of water to form insoluble cementitious products. The preferred pozzolana is silica flour, although ground silica sand, burned oil-shale, flyash, ground brick, or tile, volcanic ash, granulated slag, diatomaceous earth, pumice dust, glass polishing waste, diatomaceous pozzolanas may be utilized.

Preferably, a pre-formed foam is utilized, the foam being introduced into the cementitious slurry after the remainder of the slurry has been formed. Foaming agents of the following types may be used: detergents, resin soap, saponin, alkylated naphthalene, sulfonates, neutralized synthetic resins or hydrolyzed proteins, such as keratin, casein, or commercial foam liquids, such as National Cote HT-1 manufactured by National Foam Systems, Inc., of Westchester, Pennsylvania.

To form a typical casting slurry for use in the method of this invention, the following composition may be utilized:

|  | Percent |
|---|---|
| High early cement | 28.6 |
| Silica flour | 66.5 |
| Quicklime | 4.9 |

Calcium chloride may be added as an accelerator to an extent equal to 2% by weight of the cement in the slurry dry ingredients. As exemplary of a suitable process, the following procedure may be followed:

The dry ingredients are mixed with an amount of water sufficient to yield a water to solids ratio of about 0.75 by weight and to yield a cementitious slurry having a wet density of about 46 lbs. per cubic foot. A commercial foaming agent sold under the trade name "National Foam Liquid," manufactured by National Foam Systems, Inc., of Westchester, Pennsylvania, and consisting of a 3% solution of the foaming agent and water and sufficient air to form a consistent air stable foam is utilized to an extent consisting of 0.016 gallon of foaming agent per 100 lbs. of slurry.

Following the formation of the slurry, the slurry is cast in the form of a block into the mold space 15, the mold space being subdivided transversely by the grids of wire 35 retained by the channels 21. Further, intermediate the grids and to either side of the mold space and the adjacent slip plates 42 are positioned reinforcing grids 50 formed of steel rods and fabricated to a rectangular design of conventional reinforcing pattern. The reinforcing grids 50 are retained in position by suitable overhead supports (not shown in the drawings for purposes of clarity of illustration).

After the slurry has been cast in to the mold space 15, with the reinforcing grids 50 and the wire grids 35 in situ, the entire cast block is pre-cured.

Normal pre-curing procedure involves allowing the block to sit at atmospheric temperature and pressure for a period on the order of 8 hours, so that the cementitious ingredients of the slurry may develop sufficient strength to accommodate the segregation of the block into slabs of sufficient strength to be self-sustaining.

However, in accordance with the present invention, each of the wire grids 35 is connected to a source of heating electricity, either direct or alternating, the connection of the various grids to the source being either in series or in parallel. Inasmuch as the wires 35 forming the grids are of the electric resistance type, such as chrome-nickel alloy or high tensile copper alloy types, substantial heat is generated in the grids by virtue of the flow of electric power therethrough.

In the curing of a cementitious slurry of the prefoamed type, temperatures in excess of 150° F. are avoided in order to prevent thermal break-down of the foam. It has been found that by inducing a temperature rise in the block (by virtue of the electric heating thereof) on the order of 50° F., the normal 8 hour curing cycle may be cut in half or to a pre-curing cycle of 4 hours. The substantial saving in mold requirements, floor space necessary for holding the slurry during pre-curing, etc., will be readily appreciated.

Following the pre-heating, the block filling the mold space 15 is severed into slabs or other predetermined shapes by merely elevating the elements 21 and the wire grids carried thereby by suitable means, as by means of the hook 41 illustrated in Fig. 2 of the drawings. By so elevating the wire grids, the grids slice the pre-cured cake or block into slabs. The number of slabs formed are determined by the number of wire grids transversely spaced across the interior of the mold space 15. Following an initial upward movement of a dimension equivalent to the spacing between adjacent longitudinal reaches of the grid, the block is completely severed and the grid may be easily and readily removed throughout the remainder of the distance necessary to elevate the channels and grids completely from the mold space.

Thus, the wire grids serve the dual function of internally pre-curing the molded block, and of severing the block into slabs of the desired dimensions on relative movement of the block and the wire.

One additional function which is developed by the wires is that the pre-curing of the block takes place primarily along the severance planes of the block, i.e., in those planes along which the block is to be severed into the individual slabs. A case hardening effect is obtained whereby each slab has an exterior surface which is cured to a greater extent than the interior surfaces thereof, thereby reducing the time necessary to pre-cure the slabs sufficiently to be self-sustaining. In other words, the interior of each slab will be cured to an extent less than the exterior thereof, but this lesser curing of the interior of the slabs is not necessary other than to give the slabs sufficient strength to be self-sustaining after they are separated from the remainder of the block. Further, the lesser cured interior portions of the slabs are reinforced by the interior steel reinforcing grids.

Following the pre-curing and severing of the block into slabs, the slab is stripped from the mold by suitable means, as by the apparatus illustrated in Fig. 6 of the drawings, and the individual slabs are then separated from one another and the stripping plates 42 and 43 are removed from the exterior surfaces of the exterior slabs.

The segregated slabs are then autoclaved or otherwise completely cured. One satisfactory curing process involves the subjection of the pre-cured slabs, in an autoclave, to 150 lbs. per square inch of steam for a period of time on the order of 10 hours, an additional 3 hours in allowed for attaining the pressure of 150 lbs. per square inch and a further 3 hours is allowed for reducing the pressure to atmosphere following the autoclaving period.

Thus, it will be seen that the present invention provides an improved apparatus for the formation of slabs or other shapes of calcium silicate, and preferably slabs of foamed calcium silicate. The mold space 15 is preferably of unit slab length and breadth and of multi-slab width. This mold space is subdivided into slab-thickness dimension by the wire grids. The wire grids serve not only to pre-cure the block along the slab severance planes, but also to actually sever the block into distinct slabs after the pre-curing operation is finished. Further, a case hardening effect is obtained which even further reduces the time necessary to form self-sustaining slabs.

While preferred embodiments have been described above in detail, it will be understood that numerous modifications might be resorted to without departing from the scope of the invention as defined in the following claims.

I claim:

1. In a method of forming cast calcium silicate slabs, the steps of casting an aqueous calcium silicate slurry into a space of unit slab length and width dimensions and of multiple slab thickness dimensions with electrically resistant cutting wires disposed therein at locations corresponding to unit slab thicknesses, passing an electric current through said wires to heat the cast slurry locally, pre-curing the slurry to an extent sufficient to form a self-sustaining block, those heated block portions being pre-cured to an extent greater than those portions not heated, and effecting relative movement of said wires and said cast block to sever the block into slabs of unit thickness along planes including said wires and encompassed by the heated block portions.

2. In a method of forming cast calcium silicate slabs, the steps of casting an aqueous calcium silicate slurry block having electrically resistant cutting wires disposed therein and subdividing the block into slabs, pre-curing the block by the passage of electric current through said wires to heat the cast slurry internally, and severing the block into slabs by relative movement of said wires and said cast block, the severance of the block being limited to those regions previously pre-cured by the electric current flow through said wires.

3. In a method of forming cast calcium silicate slabs, the steps of casting a body of aqueous calcium silicate slurry of unit slab length and breadth and of multiple slab thickness, embedding in said slurry a plurality of wire grids spaced uniformly at unit slab thickness dimensions, passing an electric current through said wire grids to at least partially cure said cast slurry body in the immediate vicinity of each of said grids to such an extent that the body is self-sustaining, and moving said grids relative to said body to sever the body into unit slabs along planes aligned with each of said grids.

4. In a method of forming slabs of cellular concrete, the steps of subdividing a mold space of multiple slab dimensions into slab dimensions by the insertion thereinto of grids of electrical resistance cutting wires, disposing in each space of slab dimension a reinforcing grid, filling the mold space with a cementitious slurry, passing a heating current through said wire grids to locally cure the slurry, and removing the wire grids only to subdivide the locally cured slurry into slabs each of which has case-hardened surfaces due to the curing of the slurry by the heating current and a reinforcing grid in situ therein.

5. In a method of forming cast calcium silicate slabs, the steps of casting an aqueous cellular cement slurry into a space of unit slab length and width dimensions and of multiple slab thickness dimensions, concurrently casting in situ a plurality of electrically resistant cutting wires disposed in said space at locations corresponding to unit slab thicknesses, passing an electric current through said wires to heat the cast slurry locally for a period time sufficient to internally precure the slurry sufficiently to form a self-sustaining block, and removing said wires from said cast block in the direction of one of said unit dimensions to sever said block into unit slabs.

6. In a method of forming a plurality of calcium silicate slabs from a cast body of aqueous calcium silicate slurry of unit slab length and breadth and of multiple slab thickness, the steps of disposing in said slurry a plurality of wire grids formed of parallel reaches of aligned wire strands spaced uniformly at unit slab thickness dimensions and each said grid having a common plane located at one of said unit dimensions, passing an electric current through said wire grids to only partially and locally cure said cast slurry body at said thickness dimensions to an extent such that the body is self-sustaining, moving said grids in the direction of strand alignment and in the common plane of said grids, respectively, to sever the body into unit slabs, and autoclaving the partially cured slabs.

References Cited in the file of this patent
UNITED STATES PATENTS

| | | |
|---|---|---|
| 1,361,148 | Fontaine | Dec. 7, 1920 |
| 1,435,985 | Scohy | Nov. 21, 1922 |
| 1,453,040 | Crozier | Apr. 24, 1923 |
| 2,232,122 | Lindman | Feb. 18, 1941 |
| 2,334,540 | Miller | Nov. 16, 1943 |
| 2,683,916 | Kelly | July 20, 1954 |
| 2,841,856 | Gelbman | July 8, 1958 |

FOREIGN PATENTS

| | | |
|---|---|---|
| 620,356 | Great Britain | Mar. 23, 1949 |
| 676,627 | Great Britain | July 30, 1952 |